United States Patent
Joncheray et al.

(10) Patent No.: US 12,297,332 B2
(45) Date of Patent: May 13, 2025

(54) LOW VISCOSITY (METH)ACRYLATES AS REACTIVE ADDITIVES IN REACTIVE COMPOSITIONS FOR MAKING RIGID POLYURETHANE/POLYISOCYANURATE COMPRISING FOAMS

(71) Applicant: HUNTSMAN INTERNATIONAL LLC, The Woodlands, TX (US)

(72) Inventors: Thomas Julien Joncheray, Woluwe Saint Pierre (BE); Jacopo Bernardini, Kessel-Lo (BE); Jan Vandenbroeck, Scherpenheuvel-Zichem (BE)

(73) Assignee: HUNTSMAN INTERNATIONAL LLC, The Woodlands, TX (US)

( * ) Notice: Subject to any disclaimer, the term of this patent is extended or adjusted under 35 U.S.C. 154(b) by 0 days.

(21) Appl. No.: 17/054,360

(22) PCT Filed: May 9, 2019

(86) PCT No.: PCT/EP2019/061935
§ 371 (c)(1),
(2) Date: Nov. 10, 2020

(87) PCT Pub. No.: WO2019/219503
PCT Pub. Date: Nov. 21, 2019

(65) Prior Publication Data
US 2021/0189083 A1    Jun. 24, 2021

(30) Foreign Application Priority Data

May 14, 2018    (EP) .................................... 18172124

(51) Int. Cl.
| | | |
|---|---|---|
| C08F 283/00 | (2006.01) | |
| C08G 18/16 | (2006.01) | |
| C08G 18/76 | (2006.01) | |
| C08J 9/00 | (2006.01) | |
| C08K 5/10 | (2006.01) | |
| C08K 5/101 | (2006.01) | |
| C08L 75/04 | (2006.01) | |

(52) U.S. Cl.
CPC ........... *C08J 9/0061* (2013.01); *C08G 18/16* (2013.01); *C08G 18/7664* (2013.01); *C08J 9/0023* (2013.01); *C08J 9/0038* (2013.01); C08G 2110/0025 (2021.01); C08J 2205/10 (2013.01); C08J 2351/08 (2013.01); C08J 2375/08 (2013.01); C08J 2433/04 (2013.01); C08J 2435/02 (2013.01); C08J 2483/12 (2013.01)

(58) Field of Classification Search
CPC ....................... C08G 18/00; C08G 2110/0025
See application file for complete search history.

(56) References Cited

U.S. PATENT DOCUMENTS

| | | | |
|---|---|---|---|
| 4,137,200 A * | 1/1979 | Wood | C08G 18/10 521/905 |
| 4,250,005 A * | 2/1981 | Lamplugh | C08G 18/637 521/50.5 |
| 5,369,147 A | 11/1994 | Mushovic | |
| 5,561,172 A * | 10/1996 | Omure | C08G 18/2027 521/131 |
| 6,103,822 A * | 8/2000 | Housel | C08G 18/12 528/307 |
| 6,455,606 B1 | 9/2002 | Kaku et al. | |
| 2003/0087974 A1* | 5/2003 | Lekovic | C08G 18/672 521/99 |
| 2008/0132593 A1* | 6/2008 | Reinheimer | C08G 18/638 521/93 |
| 2009/0215917 A1* | 8/2009 | Trotter | A61P 31/04 521/157 |
| 2013/0030067 A1* | 1/2013 | Mooney | C08G 18/3218 521/107 |
| 2014/0206786 A1 | 7/2014 | Xu et al. | |

OTHER PUBLICATIONS

Product Data Sheet for Methyl Methacrylate (MMA) obtained from the Dow Chemical Company website in May 2023 (Year: 2023).*
International Search Report received in corresponding PCT Application No. PCT/EP2019/061935 completed May 21, 2019 and mailed May 28, 2019.
Written Opinion received in corresponding PCT Application No. PCT/EP2019/061935 completed May 21, 2019 and mailed May 28, 2019.

* cited by examiner

*Primary Examiner* — Melissa A Rioja
(74) *Attorney, Agent, or Firm* — HUNTSMAN INTERNATIONAL LLC; Lewis Craft

(57) ABSTRACT

A reactive composition is disclosed for making a polyisocyanurate-polyurethane comprising rigid foam (PIR-PUR), said reactive composition comprising a polyisocyanate composition, an isocyanate-reactive composition, at least one catalyst compound suitable for making the PIR-PUR comprising foam, at least one blowing agent; and optionally one or more surfactants, one or more flame retardants, one or more antioxidants, or combinations thereof characterized in that the reactive composition further comprises a reactive viscosity reducer selected from at least one acrylate and/or methacrylate compound having no isocyanate-reactive groups and having a viscosity at 25° C. below 100 mPa·s.

10 Claims, No Drawings

LOW VISCOSITY (METH)ACRYLATES AS REACTIVE ADDITIVES IN REACTIVE COMPOSITIONS FOR MAKING RIGID POLYURETHANE/POLYISOCYANURATE COMPRISING FOAMS

CROSS-REFERENCE TO RELATED APPLICATIONS

This application is the National Phase of International Application PCT/EP2019/061935 filed May 9, 2019 and which claims priority to European Application Serial No. 18172124.2 filed May 14, 2018. The noted applications are incorporated herein by reference.

FIELD OF INVENTION

The present invention is related to the use of low viscosity (meth)acrylates as reactive viscosity reducing compounds to reduce the viscosity of reactive compositions used for making polyisocyanurate (PIR) and/or polyurethane (PUR) comprising rigid foams, in particular PIR and/or PUR comprising rigid thermal and/or acoustic insulation foams as well as PR and/or PUR comprising rigid structural foams.

Further the present invention is related to reactive compositions comprising low viscosity reactive acrylate and/or methacrylate compounds as viscosity reducers and a process using said reactive compositions for preparing said polyisocyanurate (PIR) and/or polyurethane (PUR) comprising rigid foams.

Still further the present invention is concerned with polyisocyanurate (PIR) and/or polyurethane (PUR) comprising rigid foams suitable for use as thermal insulation foams obtained by using the low viscosity (meth)acrylates as viscosity reducers according to the invention.

BACKGROUND

In rigid foam formulations, viscosity reducers are typically incorporated to improve properties such as foam flow, mixing between polyol and isocyanate blends, compatibility with physical blowing agents, foam density/density distribution, demoulding time, surface defects, adhesion . . . . Potential applications include for instance composite panels, spray foams, insulation boards and blocks (IBB), pipes, one component foams (OCF) and appliances. Viscosity reducers such as TEP (triethyl phosphate) or TCPP (tris(2-chloroisopropyl)phosphate) are commonly used but they have a negative impact on final foam mechanical properties (i.e. lower compression strength, lower dimensional stability . . . ) due to their plasticizing effect. These viscosity reducers are typically unreactive.

To compensate for the deteriorated mechanical properties originating from the use of these unreactive viscosity reducers a possible solution is to increase foam density (e.g. with lower blowing agent levels, increased overpack . . . ).

Unfortunately, an increase in foam density is often not desired for instance from a weight perspective (heavier parts, e.g. pipes, appliances . . . ) and also from a cost aspect (larger amount of raw materials required). From a safety standpoint, unreactive viscosity reducers are also more likely to diffuse out of the rigid foams triggering additional issues such as increased VOC levels and chemical leaching.

There is hence still a need to look for viscosity reducers which are suitable for use as additives in the reactive compositions used for making polyisocyanurate (PIR) and/ or polyurethane (PUR) comprising rigid foams and which do not have a negative impact on the mechanical properties of the final obtained PIR and/or PUR comprising rigid foams.

GOAL OF THE INVENTION

The goal of the invention is to improve the processing for making polyisocyanurate (PIR) and/or polyurethane (PUR) comprising rigid foams by lowering the viscosity of the reactive compositions used for making the foams and avoiding deterioration of the mechanical properties of the foam.

Lowering the viscosity of the reactive compositions used for making polyisocyanurate (PIR) and/or polyurethane (PUR) comprising rigid foams is useful for instance for improved mould filling, improved mixing between isocyanate-reactive and isocyanate blends, improved compatibility with blowing agents and reduced surface defects in the final foams.

Surprisingly we have found that certain acrylates can be used as additives in order to reduce the viscosity of reactive compositions used for making polyisocyanurate (PIR) and/ or polyurethane (PUR) comprising rigid foams without having a negative impact on the foam mechanical properties.

As a result of the lower viscosity the processing is facilitated and foaming is improved without deteriorating the mechanical properties of the foam.

SUMMARY OF THE INVENTION

According to a first aspect, a reactive composition for making a polyisocyanurate-polyurethane comprising rigid foam (PIR-PUR) is disclosed, said reactive composition comprising:
  a) a polyisocyanate composition comprising one or more polyisocyanate compounds; and
  b) an isocyanate-reactive composition comprising one or more isocyanate-reactive compounds; and
  c) at least one catalyst compound suitable for making the polyisocyanurate (PIR) and/or polyurethane (PUR) comprising foam, and
  d) at least one blowing agent; and
  e) optionally one or more surfactants, one or more flame retardants, one or more antioxidants, or combinations thereof
characterized in that the reactive composition further comprises a reactive viscosity reducer selected from at least one acrylate and/or methacrylate compound having no isocyanate-reactive groups and selected from acrylate and/or methacrylate compound(s) having 1 reactive acrylate or methacrylate group and having a viscosity at 25° C. below 100 mPa·s and/or acrylate and/or methacrylate compound(s) having 2 or 3 reactive acrylate and/or methacrylate groups and having a viscosity at 25° C. below 35 mPa·s.

According to embodiments, the acrylate and/or methacrylate compound(s) of the invention have 1 reactive (meth)acrylate group and have a viscosity at 25° C. below 50 mPa·s, preferably ≤30 mPa·s.

According to embodiments, the acrylate and/or methacrylate compound(s) of the invention have 2 or 3 reactive (meth)acrylate groups and have a viscosity at 25° C.≤30 mPa·s.

According to embodiments, the amount of acrylate and/or methacrylate compound(s) in the reactive composition is in the range 0.1 wt % up to 50 wt %, preferably in the range 0.5 wt % up to 35 wt %, more preferably in the range 1 wt % up to 20 wt % calculated on the total weight of the reactive composition.

According to embodiments, the acrylate and/or methacrylate compound of the invention is selected from Ethylene Glycol Dimethacrylate (EGDMA), Diethylene Glycol Dimethacrylate (DEGDMA) and/or Isobornyl methacrylate (IBOMA).

According to embodiments, the acrylate and/or methacrylate compound of the invention has a boiling point under atmospheric pressure higher than 150° C., preferably 200° C.

According to embodiments, the reactive composition of the invention further comprises a thermal radical initiator to initiate (meth)acrylate polymerization.

According to embodiments, the polyisocyanate compounds used in the reactive composition of the invention are selected from a toluene diisocyanate, a methylene diphenyl diisocyanate or a polyisocyanate composition comprising a methylene diphenyl diisocyanate or a mixture of such polyisocyanates.

According to embodiments, the one or more isocyanate-reactive compounds used in the reactive composition of the invention comprise polyols and polyol mixtures having average hydroxyl numbers of from 50 to 1000, especially from 150 to 700 mg KOH/g, and hydroxyl functionalities of from 2 to 8, especially from 3 to 8.

According to embodiments, the blowing agent used in the reactive composition of the invention is present in an amount of up to 80 parts by weight, preferably from 0.5 to 60 parts by weight, more preferably from 1 to 45 parts by weight per hundred parts by weight isocyanate-reactive compounds.

According to a second aspect of the invention, a method for reducing the viscosity of a reactive composition for making a polyisocyanurate (PIR) and/or polyurethane (PUR) comprising rigid foam is disclosed, said method comprising adding the reactive viscosity reducer according to the first aspect of the invention to a reactive composition for making a polyisocyanurate-polyurethane comprising rigid foam (PIR-PUR).

According to embodiments, the reactive viscosity reducer is added to the isocyanate composition before combining and mixing the isocyanate composition with the isocyanate-reactive composition.

According to embodiments, the reactive viscosity reducer is added to the isocyanate-reactive composition before combining and mixing the isocyanate-reactive composition with the isocyanate composition.

According to embodiments, the reactive viscosity reducer is added as a separate stream to the reactive composition when combining and mixing the isocyanate-reactive composition with the isocyanate composition.

According to a third aspect, a process for making a polyisocyanurate and/or polyurethane comprising rigid foam is disclosed, said process comprising combining and/or mixing the ingredients a) to e) of the reactive composition of the first aspect of the invention and the reactive viscosity reducer of the invention to form a reactive composition.

According to embodiments, the foam of the invention is a polyisocyanurate (PIR) comprising foam and the process is performed at an isocyanate index of 180 or higher, more preferably at an isocyanate index higher than 250 and the catalyst compound is selected from at least one trimerisation catalyst and the foam is a polyisocyanurate (PIR) comprising foam.

According to embodiments, the foam of the invention is a polyurethane (PUR) comprising foam and the process is performed at an isocyanate index in the range 80-180, more preferably at an isocyanate index in the range 90-150 and the catalyst compound is selected from at least one polyurethane catalyst and the foam is a polyurethane (PUR) comprising foam.

According to a fourth aspect, a polyisocyanurate comprising rigid foam or polyurethane comprising rigid foam comprising acrylate and/or methacrylate polymers and obtainable by the process according to the third aspect of the invention is disclosed.

According to a fifth aspect, the use of the polyisocyanurate and/or polyurethane comprising rigid foam made according to the third aspect and using the reactive composition of the first aspect of the invention for thermal insulation, acoustic insulation and/or in structural panels is disclosed.

The independent and dependent claims set out particular and preferred features of the invention. Features from the dependent claims may be combined with features of the independent or other dependent claims as appropriate.

The above and other characteristics, features and advantages of the present invention will become apparent from the following detailed description, which illustrate, by way of example, the principles of the invention. This description is given for the sake of example only, without limiting the scope of the invention.

DEFINITIONS AND TERMS

In the context of the present invention the following terms have the following meaning:
1) isocyanate index or NCO index or index:
   the ratio of NCO-groups over isocyanate-reactive hydrogen atoms present in a formulation, given as a percentage:

$$\frac{[NCO] \times 100}{[\text{active hydrogen}]} (\%).$$

In other words the NCO-index expresses the percentage of isocyanate actually used in a formulation with respect to the amount of isocyanate theoretically required for reacting with the amount of isocyanate-reactive hydrogen used in a formulation.
   It should be observed that the isocyanate index as used herein is considered from the point of view of the actual polymerisation process preparing the material involving the isocyanate ingredient and the isocyanate-reactive ingredients. Any isocyanate groups consumed in a preliminary step to produce modified polyisocyanates (including such isocyanate-derivatives referred to in the art as prepolymers) or any active hydrogens consumed in a preliminary step (e.g. reacted with isocyanate to produce modified polyols or polyamines) are not taken into account in the calculation of the isocyanate index. Only the free isocyanate groups and the free isocyanate-reactive hydrogens (including those of water, if used) present at the actual polymerisation stage are taken into account.
2) The expression "isocyanate-reactive compounds" and "isocyanate-reactive hydrogen atoms" as used herein for the purpose of calculating the isocyanate index refers to the total of active hydrogen atoms in hydroxyl and amine groups present in the isocyanate-reactive compounds; this means that for the purpose of calculating the isocyanate index at the actual polymerisation process one hydroxyl group is considered to comprise one reactive hydrogen, one primary amine group is considered to comprise one reactive hydrogen and one water molecule is considered to comprise two active hydrogens.

3) The term "OH value" or "hydroxyl value" is a measure of the content of free hydroxyl groups in a chemical substance, usually expressed in units of the mass of potassium hydroxide (KOH) in milligrams equivalent to the hydroxyl content of one gram of the chemical substance (mg KOH/g). The analytical method used to determine hydroxyl value traditionally involves acetylation of the free hydroxyl groups of the substance with acetic anhydride in pyridine solvent. After completion of the reaction, water is added, and the remaining unreacted acetic anhydride is converted to acetic acid and measured by titration with potassium hydroxide.

4) The term "average nominal hydroxyl functionality" (or in short "functionality") is used herein to indicate the number average functionality (number of hydroxyl groups per molecule) of the polyol or polyol composition on the assumption that this is the number average functionality (number of active hydrogen atoms per molecule) of the initiator(s) used in their preparation although in practice it will often be somewhat less because of some terminal unsaturation.

5) The word "average" refers to number average unless indicated otherwise.

6) "Trimerization catalyst" as used herein refers to a catalyst being able to catalyse (promote) the formation of isocyanurate groups from polyisocyanates. This means that isocyanates can react with one another to form macromolecules with isocyanurate structures (polyisocyanurate=PIR). Reactions between isocyanates-polyols and isocyanates-isocyanates (homopolymerization) can take place simultaneously or in direct succession, forming macromolecules with urethane and isocyanurate structures (PIR-PUR).

7) "Free rise density" refers to density measured on foam samples made under atmospheric conditions (in the presence of blowing agents) according to ISO 845.

8) "Viscosity" as used herein was measured with a Brookfield R/S-CPS+P2 Rheometer by using a cone/plate 25 mm diameter (C25-2) geometry. Measurements were performed at 25° C. by using a 3-step program, achieving a maximum shear stress of 350 Pa.

9) "Closed cell content" (CCC) as used herein was measured using an AccuPyc 1330 Pycnometer from Micromeritics according to ASTM D6226-15.

10) "Compression strength" or "foam compression strength" as used herein was measured according to the ISO 844 norm, with a compression of 10% of the initial thickness of the sample at a rate of 10% of its original thickness per minute. Compression strength was measured along the three dimensions of the foam samples (T: thickness, W: width, L: length). Mean compression strength was then determined according to the following formula:

$$\text{Mean } CS \ [MCS] = \sqrt[3]{CS_{(T)} \cdot CS_{(W)} \cdot CS_{(L)}}$$

DETAILED DESCRIPTION

The present invention will be described with respect to particular embodiments.

It is to be noticed that the term "comprising", used in the claims, should not be interpreted as being restricted to the means listed thereafter; it does not exclude other elements or steps. It is thus to be interpreted as specifying the presence of the stated features, steps or components as referred to, but does not preclude the presence or addition of one or more other features, steps or components, or groups thereof. Thus, the scope of the expression "a device comprising means A and B" should not be limited to devices consisting only of components A and B. It means that with respect to the present invention, the only relevant components of the device are A and B.

Throughout this specification, reference to "one embodiment" or "an embodiment" are made. Such references indicate that a particular feature, described in relation to the embodiment is included in at least one embodiment of the present invention. Thus, appearances of the phrases "in one embodiment" or "in an embodiment" in various places throughout this specification are not necessarily all referring to the same embodiment, though they could. Furthermore, the particular features or characteristics may be combined in any suitable manner in one or more embodiments, as would be apparent to one of ordinary skill in the art.

It is to be understood that although preferred embodiments and/or materials have been discussed for providing embodiments according to the present invention, various modifications or changes may be made without departing from the scope and spirit of this invention.

The present invention relates to reactive viscosity reducing compounds which can be used as additives in reactive compositions for making polyisocyanurate (PIR) and/or polyurethane (PUR) comprising rigid foams, more in particular PR and/or PUR comprising rigid thermal and/or acoustic insulation foams, as well as PIR and/or PUR comprising rigid structural foams.

According to embodiments, the reactive viscosity reducing additive should be a viscosity reducing compound having at least one methacrylate and/or acrylate reactive group and selected from at least one acrylate and/or methacrylate compound, having no isocyanate-reactive groups and having a viscosity at 25° C. below 100 mPa·s, preferably below 50 mPa·s, more preferably below 30 mPa·s.

We have found that low viscosity acrylate and/or methacrylate compounds can be used as "reactive" viscosity reducers instead of the standard non-reactive viscosity reducing compounds used in the prior art and mentioned above. The heat generated by the Polyurethane/Polyurea/Polyisocyanurate forming reactions during foaming was found to be sufficient to trigger (meth)acrylate polymerization close to or after the end of rise and not significantly during the early foaming stages. Post foaming temperature treatment can eventually be performed if needed to maximize (meth)acrylate polymerization. The use of a thermal radical initiator is also possible to initiate (meth)acrylate polymerization but is optional. As a result, the low viscosity (meth)acrylates initially function as the conventional unreactive viscosity reducers within the reactive compositions (the isocyanate-reactive and isocyanate blends) and during early foaming stages with the advantage that they ultimately polymerize after foaming has taken place (radical polymerization mechanism), therefore avoiding any plasticizing effects obtained with conventional unreactive viscosity reducers which are detrimental mainly to the mechanical properties of the obtained foam.

The invention discloses a reactive composition for making a polyisocyanurate and/or polyurethane comprising rigid foam, said reactive composition comprising:

a) a polyisocyanate composition comprising one or more polyisocyanate compounds; and
b) an isocyanate-reactive composition comprising one or more isocyanate-reactive compounds; and
c) at least one catalyst compound selected from a trimerization (PIR) catalyst and/or polyurethane (PUR) forming catalyst, and
d) at least one blowing agent; and
e) optionally one or more surfactants, one or more flame retardants, one or more antioxidants, or combinations thereof characterized in that the reactive composition further comprises a reactive viscosity reducer selected from at least one acrylate and/or methacrylate compound having no isocyanate-reactive group and selected from acrylate and/or methacrylate compound(s) having 1 reactive acrylate or methacrylate group and having a viscosity at 25° C. below 100 mPa·s and/or acrylate and/or methacrylate compound(s) having 2 or 3 reactive acrylate and/or methacrylate groups and having a viscosity at 25° C. below 35 mPa·s.

According to embodiments, the amount of acrylate and/or methacrylate compound(s) in the reactive composition is in the range 0.1 wt % up to 50 wt %, preferably in the range 0.5 wt % up to 35 wt %, more preferably in the range 1 wt % up to 20 wt % calculated on the total weight of the reactive composition.

According to embodiments, the at least one (meth)acrylate compound has only 1 reactive (meth)acrylate group and has a viscosity at 25° C. below 100 mPa·s, preferably below 50 mPa·s, preferably ≤30 mPa·s.

According to embodiments, the at least one (meth)acrylate compound has only 1 reactive acrylate group or in other words is selected from mono functional acrylate compounds such as Cyclic Trimethylolpropane Formal Acrylate (CTFA), 3,3,5-Trimethyl cyclohexyl Acrylate (TMCHA), Isobornyl Acrylate (IBOA), 4-tert-Butylcyclohexyl Acrylate (TBCHA), Benzyl Acrylate (BZA), and/or Phenol (EO) Acrylate (PHEA) and mixtures thereof.

According to embodiments, the at least one (meth)acrylate compound has only 1 reactive methacrylate group or in other words is selected from mono functional methacrylate compounds such as Benzyl Methacrylate (BZMA), Phenoxyethyl Methacrylate (PHEMA), Tetrahydrofurfuryl Methacrylate (THFMA) and/or Isobornyl Methacrylate (IBOMA) and mixtures thereof.

According to embodiments, the at least one (meth)acrylate compound has 2 or 3 reactive acrylate and/or methacrylate groups and has a viscosity at 25° C. below 35 mPa·s, more preferably ≤30 mPa·s.

According to embodiments, the at least one (meth)acrylate compound has 2 or 3 reactive acrylate groups or in other words is selected from acrylate compounds having an acrylate functionality of 2 or 3 such as 1,6-Hexanediol Diacrylate (HDDA), Hydroxy Pivalic Acid Neopentyl glycol Diacrylate (HPNDA), Tripropylene glycol Diacrylate (TPGDA), Dipropylene glycol Diacrylate (DPGDA), Triethylene glycol Diacrylate (TEGDA) and/or Tetraethylene glycol Diacrylate (TTEGDA) and mixtures thereof.

According to embodiments, the at least one (meth)acrylate compound has 2 or 3 reactive methacrylate groups or in other words is selected from methacrylate compounds having a methacrylate functionality of 2 or 3 such as 1,6-Hexanediol Dimethacrylate (HDDMA), 1,4-Butanediol Dimethacrylate (BDDMA), Neopentyl glycol Dimethacrylate (NPGDMA), Ethylene glycol Dimethacrylate (EGDMA), Diethylene glycol Dimethacrylate (DEGDMA), Triethylene glycol Dimethacrylate (TREGDMA), Tetraethylene glycol Dimethacrylate (T4EGDMA) and/or Polyethylene glycol 200 Dimethacrylate (PEG200DMA) and mixtures thereof.

According to embodiments, the at least one (meth)acrylate compound is a mixture of monofunctional (meth)acrylate compound(s) and higher functionality (2 or 3) (meth)acrylate compound(s).

According to embodiments, the acrylate and/or methacrylate compound(s) have a boiling point under atmospheric pressure higher than 150° C., preferably 200° C. This is preferred to avoid that the (meth)acrylates evaporate/boil during foam formation and interfere with the blowing process of the foams.

According to embodiments, the reactive composition further comprises a thermal radical initiator to initiate (meth)acrylate polymerization. Luperox P (t-butyl peroxybenzoate) is a good example of a suitable initiator with a 10 h half-life temperature of 104° C. A thermal initiator which is active at too low temperatures (e.g. too close to room temperature) is to be avoided as it will likely result in poor foam flow on top of handling safety issues.

According to embodiments, the polyisocyanate compounds used in the process for making the foam according to the invention are selected from organic isocyanates containing a plurality of isocyanate groups including aliphatic isocyanates such as hexamethylene diisocyanate and more preferably aromatic isocyanates such as m- and p-phenylene diisocyanate, tolylene-2,4- and 2,6-diisocyanates, diphenylmethane-4,4'-diisocyanate, chlorophenylene-2,4-diisocyanate, naphthylene-1,5-diisocyanate, diphenylene-4,4'-diisocyanate, 4,4'-diisocyanate-3,3'-dimethyldiphenyl, 3-methyldiphenylmethane-4,4'-diisocyanate and diphenyl ether diisocyanate, cycloaliphatic diisocyanates such as cyclohexane-2,4- and 2,3-diisocyanates, 1-methyl cyclohexyl-2,4- and 2,6-diisocyanates and mixtures thereof and bis-(isocyanatocyclohexyl-)methane and triisocyanates such as 2,4,6-triisocyanatotoluene and 2,4,4'-triisocyanatodiphenyl ether.

According to embodiments, the polyisocyanate composition comprises mixtures of polyisocyanates. For example a mixture of tolylene diisocyanate isomers such as the commercially available mixtures of 2,4- and 2,6-isomers and also the mixture of di- and higher poly-isocyanates produced by phosgenation of aniline/formaldehyde condensates. Such mixtures are well-known in the art and include the crude phosgenation products containing mixtures of methylene bridged polyphenyl polyisocyanates, including diisocyanate, triisocyanate and higher polyisocyanates together with any phosgenation by-products.

Preferred polyisocyanate compositions of the present invention are those wherein the polyisocyanate is an aromatic diisocyanate or polyisocyanate of higher functionality in particular crude mixtures of methylene bridged polyphenyl polyisocyanates containing diisocyanates, triisocyanate and higher functionality polyisocyanates. Methylene bridged polyphenyl polyisocyanates (e.g. Methylene diphenyl diisocyanate, abbreviated as MDI) are well known in the art and have the generic formula I wherein n is one or more and in the case of the crude mixtures represents an average of more than one. They are prepared by phosgenation of corresponding mixtures of polyamines obtained by condensation of aniline and formaldehyde.

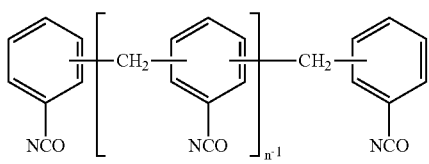

(I)

Other suitable polyisocyanate compositions may include isocyanate ended prepolymers made by reaction of an excess of a diisocyanate or higher functionality polyisocyanate with a hydroxyl ended polyester or hydroxyl ended polyether and products obtained by reacting an excess of diisocyanate or higher functionality polyisocyanate with a monomeric polyol or mixture of monomeric polyols such as ethylene glycol, trimethylol propane or butanediol. One preferred class of isocyanate-ended prepolymers are the isocyanate ended prepolymers of the crude mixtures of methylene bridged polyphenyl polyisocyanates containing diisocyanates, triisocyanates and higher functionality polyisocyanates.

According to embodiments, the polyisocyanate compounds in the polyisocyanate composition are selected from a toluene diisocyanate, a methylene diphenyl diisocyanate or a polyisocyanate composition comprising a methylene diphenyl diisocyanate or a mixture of such polyisocyanates.

According to embodiments, the one or more isocyanate reactive compounds include any of those known in the art for the preparation of polyisocyanurate and/or polyurethane comprising rigid foams. Of particular importance for the preparation of rigid foams are polyols and polyol mixtures having average OH values of from 50 to 1000 mg KOH/g, especially from 150 to 700 mg KOH/g, and hydroxyl (OH) functionalities of from 2 to 8, especially from 3 to 8. Suitable polyols have been fully described in the prior art and include polyether based polyols which are reaction products of alkylene oxides, for example ethylene oxide and/or propylene oxide, with initiators containing from 2 to 8 active hydrogen atoms per molecule. Suitable initiators include: polyols, for example glycerol, trimethylolpropane, triethanolamine, pentaerythritol, sorbitol and sucrose; polyamines, for example ethylene diamine, tolylene diamine (TDA), diaminodiphenylmethane (DADPM) and polymethylene polyphenylene polyamines; and aminoalcohols, for example ethanolamine and diethanolamine; and mixtures of such initiators. Other suitable polyols include polyester based polyols obtained by the condensation of appropriate proportions of glycols and higher functionality polyols with dicarboxylic or polycarboxylic acids. Still further suitable polymeric polyols include hydroxyl terminated polythioethers, polyamides, polyesteramides, polycarbonates, polyacetals, polyolefins and polysiloxanes.

The quantities of the one or more polyisocyanate compounds and the one or more isocyanate reactive compounds to be reacted will depend upon the nature of the polyisocyanurate (PIR) and/or polyurethane (PUR) comprising rigid foam to be produced and can be readily determined by those skilled in the art.

According to embodiments, the blowing agent may be selected from isobutene, dimethyl ether, water, methylene chloride, acetone, chlorofluorocarbons (CFCs), hydrofluorocarbons (HFCs), hydrochlorofluorocarbons (HCFCs), hydrofluoroolefins (HFOs) and hydrocarbons such as pentane. The amount of blowing agent used can vary based on, for example, the intended use and application of the foam product and the desired foam stiffness and density. The blowing agent may be present in amounts up to 80 parts by weight (pbw) per hundred weight parts isocyanate-reactive compounds (polyol), preferably from 0.5 to 60 pbw, more preferably from 1 to 45 pbw. Preferably the blowing agent comprises/contains water and the amount of water is preferably limited to amounts up to 15 pbw.

According to embodiments, the catalyst compound should be present in the reactive composition in a catalytically effective amount, preferably the catalyst compound is present in amounts such that the number of catalyst equivalents over the number of isocyanate equivalents ranges from 0.001 to 0.4, preferably in an amount from 0.01 to 0.26, or from 0.01 to 024, or from 0.02 to 0.2.

According to embodiments, one or more polyurethane catalyst compounds suitable for use herein include, but are not limited to, metal salt catalysts, such as organotins, and amine compounds, such as triethylenediamine (TEDA), N-methylimidazole, 1,2-dimethylimidazole, N-methylmorpholine, N-ethylmorpholine, triethylamine, N,N'-dimethylpiperazine, 1,3,5-tris(dimethylaminopropyl)hexahydrotriazine, 2,4,6-tris(dimethylaminomethyl)phenol, N-methyldicyclohexylamine, pentamethyldipropylene triamine, N-methyl-N'-(2-dimethylamino)-ethyl-piperazine, tributylamine, pentamethyldiethylenetriamine, hex amethyltriethylenetetramine, heptamethyltetraethylenepentamine, dimethylaminocyclohexylamine, pentamethyldipropylenetriamine, triethanolamine, dimethylethanolamine, bis(dimethylaminoethyl)ether, tris(3-dimethylamino)propylamine, or its acid blocked derivatives, and the like, as well as any mixture thereof. The catalyst compound should be present in the reactive composition in a catalytically effective amount.

According to embodiments, one or more polyisocyanurate catalyst compounds (trimerization catalysts) suitable for use herein include but are not limited to quaternary ammonium hydroxides and salts, alkali metal and alkaline earth metal hydroxides, alkoxides and carboxylates, for example potassium acetate and potassium 2-ethylhexoate, certain tertiary amines and non-basic metal carboxylates. The catalyst compound should be present in the reactive composition in a catalytically effective amount.

The invention further discloses a method for reducing the viscosity of a reactive composition for making a polyisocyanurate (PIR) and/or polyurethane (PUR) comprising rigid foam, said method comprising adding a reactive viscosity reducer selected from at least one acrylate and/or methacrylate compound having no isocyanate-reactive groups and selected from acrylate and/or methacrylate compound(s) having 1 reactive (meth)acrylate group and having a viscosity at 25° C. below 100 mPa·s and/or acrylate and/or methacrylate compound(s) having 2 or 3 reactive (meth)acrylate groups and having a viscosity at 25° C. below 35 mPa·s.

The reactive viscosity reducer according to the invention is hence added to a reactive composition for making a polyisocyanurate (PIR) and/or polyurethane (PUR) comprising rigid foam, said reactive composition comprising:
  a) a polyisocyanate composition comprising one or more polyisocyanate compounds; and
  b) an isocyanate-reactive composition comprising one or more isocyanate-reactive compounds; and
  c) at least one catalyst compound suitable for making the polyisocyanurate (PIR) and/or polyurethane (PUR) comprising foam, and
  d) at least one blowing agent; and e) optionally one or more surfactants, one or more flame retardants, one or more antioxidants, or combinations thereof.

There are many different orders of adding the reactive viscosity reducer according to the invention to a reactive composition. One of skill in the art would realize that varying the order of addition of the compounds falls within the scope of the present invention.

According to embodiments, the reactive viscosity reducing compound according to the invention is added to the isocyanate composition before combining and mixing the isocyanate composition with the isocyanate-reactive composition.

According to embodiments, the reactive viscosity reducing compound according to the invention is added to the isocyanate-reactive composition before combining and mixing the isocyanate-reactive composition with the isocyanate composition.

According to embodiments, the reactive viscosity reducing compound according to the invention is added to the reactive composition as a separate stream apart from the isocyanate composition and apart from the isocyanate-reactive composition.

The invention further discloses a process for making a polyisocyanurate and/or polyurethane comprising rigid foam, said process comprising combining and/or mixing:
a) a polyisocyanate composition comprising one or more polyisocyanate compounds; and
b) an isocyanate-reactive composition comprising one or more isocyanate-reactive compounds; and
c) at least one catalyst compound selected from a trimerization (PIR) catalyst and/or polyurethane (PUR) forming catalyst, and
d) at least one blowing agent; and
e) optionally one or more surfactants, one or more flame retardants, one or more antioxidants, or combinations thereof
characterized in that the reactive composition further comprises a reactive viscosity reducer selected from at least one acrylate and/or methacrylate compound having no isocyanate-reactive groups and selected from acrylate and/or methacrylate compound(s) having 1 reactive (meth)acrylate group and having a viscosity at 25° C. below 100 mPa·s and/or acrylate and/or methacrylate compound(s) having 2 or 3 reactive (meth) acrylate groups and having a viscosity at 25° C. below 35 mPa·s.

According to embodiments, the foam is a polyisocyanurate (PIR) comprising insulation foam and the method is performed at an isocyanate index of 180 or higher, more preferably at an isocyanate index higher than 250 and the catalyst compound is selected from at least one trimerisation catalyst and the rigid foam is a polyisocyanurate (PIR) comprising foam.

According to embodiments, the foam is a polyurethane (PUR) comprising insulation foam and the method is performed at an isocyanate index in the range 80-180, more preferably at an isocyanate index in the range 90-150 and the catalyst compound is selected from at least one polyurethane catalyst and the rigid foam is a polyurethane (PUR) comprising foam.

The present invention further relates to a polyisocyanurate and/or polyurethane comprising rigid foam made using the process according to the invention and making use of the viscosity reducing compounds according to the present invention and the use of said rigid foam as (thermal) insulating foam.

According to embodiments, the polyisocyanurate and/or polyurethane comprising foam according to the invention has a free rise density in the range between 5 kg/m$^3$ up to 800 kg/m$^3$, preferably in the range 15 kg/m$^3$ up to 500 kg/m$^3$, more preferably in the range 20 kg/m$^3$ up to 200 kg/m$^3$.

According to embodiments, the polyisocyanurate and/or polyurethane comprising foam according to the invention may be used in thermal insulation applications such as construction thermal insulation foams or appliance thermal insulation foams in e.g. insulation panels.

EXAMPLES

Chemicals Used:
Polyol 1: Glycerol/Sorbitol-initiated polyether polyol (OH value: 470 KOH/g)
Polyol 2: DADPM/DEG-initiated polyether polyol (OH value: 500 KOH/g)
Cyclopentane
Jeffcat® BDMA: Benzyldimethylamine, amine catalyst from Huntsman (OH value: 0 mgKOH/g)
Jeffcat® ZF22: 70 w % Bis-(2-dimethylaminoethyl)ether in diethylene glycol, amine catalyst from Huntsman (OH value: 251 mgKOH/g)
Jeffcat® TR90: 1,3,5-tris(3-(dimethylamino)propyl)-hexahydro-1,3,5-triazine, amine catalyst from Huntsman (OH value: 0 mgKOH/g)
TEP: TriEthylPhosphate (viscosity: ~2 mPa·s at 25° C.)
Foam stabilizer: silicon surfactant
Miramer® M221: Ethylene Glycol Dimethacrylate (EGDMA) from Miwon (viscosity: ~3-8 mPa·s at 25° C.)
Bisomer DEGDMA HI: Diethylene Glycol Dimethacrylate from GEO Specialty Chemicals (viscosity: ~5-20 mPa·s at 25° C.)
IBOMA: Isobornyl Methacrylate from Sigma-Aldrich (viscosity: ~5-10 mPa·s at 25° C.)
Luperox® P: t-butyl peroxybenzoate from Sigma-Aldrich
S5025: Suprasec® 5025 from Huntsman (Polymeric MDI, NCO value: 31.0)
PETRA: Pentaerythritol tetraacrylate from Aldrich (viscosity: ~342 mPa·s @38° C.)

Suprasec® is a trademark of the Huntsman Corporation or an Affiliate thereof and has been registered in one or more but not all countries.

Examples 1-18 According to the Invention and Comparative Examples 1-4

All foams were produced under free rise conditions by mixing under high shear with a Heidolph Mixer (~2500 rpm) for 7 s the polyol blend (prepared beforehand, including all chemicals listed in the tables except the isocyanate) and the Isocyanate. All foams were stored in the fumehood overnight before being cut and characterized.

The start of mixing is always set at time=0. Cream time (CT) is defined as when the mixture starts to foam. String time (ST) is identified as when strings of polymer can be withdrawn by dipping a pointer into the foam mix. Tack free time (TFT) is defined as when the surface of the foam stops being tacky to the touch. End of rise time (ERT) is defined as when the foam reaches its maximum height.

Table 1 summarizes the reactive compositions used and amounts of ingredients used in parts by weight (pbw) to fabricate the examples 1-9 according to the invention and comparative examples 1-4. All the examples in Table 1 use thermal initiator-free reactive compositions.

TABLE 1

| Chemical (pbw) | Comp Ex. 1 | Comp Ex. 2 | Comp Ex. 3 | Comp Ex. 4 | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|---|---|---|
| Polyol 1 | 72.5 | 72.5 | 72.5 | 72.5 | 72.5 | 72.5 | 72.5 | 72.5 | 72.5 | 72.5 | 72.5 | 72.5 | 72.5 |
| Polyol 2 | 16.0 | 16.0 | 16.0 | 16.0 | 16.0 | 16.0 | 16.0 | 16.0 | 16.0 | 16.0 | 16.0 | 16.0 | 16.0 |
| Cyclopentane | 12.0 | 12.0 | 12.0 | 12.0 | 12.0 | 12.0 | 12.0 | 12.0 | 12.0 | 12.0 | 12.0 | 12.0 | 12.0 |
| Water | 2.3 | 2.3 | 2.3 | 2.3 | 2.3 | 2.3 | 2.3 | 2.3 | 2.3 | 2.3 | 2.3 | 2.3 | 2.3 |
| Jeffcat ® BDMA | 1.5 | 1.5 | 1.5 | 1.5 | 1.5 | 1.5 | 1.5 | 1.5 | 1.5 | 1.5 | 1.5 | 1.5 | 1.5 |
| Jeffcat ® ZF 22 | 0.1 | 0.1 | 0.1 | 0.1 | 0.1 | 0.1 | 0.1 | 0.1 | 0.1 | 0.1 | 0.1 | 0.1 | 0.1 |
| Jeffcat ® TR 90 | 0.1 | 0.1 | 0.1 | 0.1 | 0.1 | 0.1 | 0.1 | 0.1 | 0.1 | 0.1 | 0.1 | 0.1 | 0.1 |
| Foam stabilizer | 1.5 | 1.5 | 1.5 | 1.5 | 1.5 | 1.5 | 1.5 | 1.5 | 1.5 | 1.5 | 1.5 | 1.5 | 1.5 |
| TEP | — | 6.0 | 15 | 30 | — | — | — | — | — | — | — | — | — |
| DEGDMA | — | — | — | — | 6.0 | 15 | 30 | — | — | — | — | — | — |
| EGDMA | — | — | — | — | — | — | — | 6.0 | 15 | 30 | — | — | — |
| IBOMA | — | — | — | — | — | — | — | — | — | — | 6.0 | 15 | 30 |
| Luperox ® P | — | — | — | — | — | — | — | — | — | — | — | — | — |
| S5025 | 181.5 | 181.5 | 181.5 | 181.5 | 181.5 | 181.5 | 181.5 | 181.5 | 181.5 | 181.5 | 181.5 | 181.5 | 181.5 |
| Iso Index | 133 | 133 | 133 | 133 | 133 | 133 | 133 | 133 | 133 | 133 | 133 | 133 | 133 |
| Polyol blend viscosity (mPa·s) | 388 | 241 | 211 | 99 | 249 | 179 | 105 | 255 | 177 | 112 | 287 | 231 | 191 |
| CT(s) | 25 | 25 | 25 | 30 | 23 | 27 | 33 | 29 | 31 | 34 | 30 | 31 | 34 |
| ST(s) | 158 | 165 | 165 | 175 | 148 | 156 | 173 | 185 | 210 | 230 | 158 | 155 | 170 |
| ERT(s) | 213 | 223 | 231 | 225 | 210 | 210 | 225 | 255 | 260 | 280 | 225 | 215 | 233 |
| TFT(s) | 318 | 338 | 338 | 570 | 320 | 350 | 560 | 510 | 545 | 690 | 310 | 308 | 335 |
| Density (kg/m³) | 28 | 29 | 30 | 32 | 29 | 30 | 31 | 32 | 31 | 32 | 30 | 30 | 32 |
| CCC (%) | 89 | 89 | 88 | 86 | 88 | 88 | 85 | 89 | 88 | 86 | 90 | 90 | 80 |
| MCS (kPa) | 103 | 103 | 97 | 89 | 111 | 116 | 114 | 137 | 123 | 123 | 112 | 108 | 120 |

From Table 1 it is clear that the polyol viscosity is significantly decreased in the presence of any of the 3 acrylates used and the magnitude of the viscosity reduction is similar to what can be achieved for equivalent amounts of prior art viscosity reducer TEP. For instance, the presence of 15 pbw of TEP leads to a polyol blend viscosity of 211 mPa·s (Comparative Example 3), while the presence of 15 pbw of DEGDMA (Example 2), EGDMA (Example 5) and IBOMA (Example 8), i.e. reactive viscosity reducers according to the invention, leads to polyol blend viscosities of 179, 177 and 231 mPa·s, respectively. For comparison, the polyol blend viscosity of Comparative Example 1 (free of any viscosity reducer) is significantly higher with a value of 388 mPa·s.

For a given amount of viscosity reducer, the foam mean Compression Strength is consistently higher in the presence of the reactive viscosity reducer according to the invention, with or without the presence of a thermal initiator (Luperox P being a radical initiator to initiate acrylate polymerisation), compared to the TEP-containing foams (comparative examples 2-4). For instance as shown in Table 1, the presence of 30 pbw of TEP leads to a MCS of 89 kPa (Comparative Example 4), while the presence of 30 pbw of DEGDMA (Example 3), EGDMA (Example 6) and IBOMA (Example 9), i.e. reactive viscosity reducers according to the invention, leads to MCS values of 114, 123 and 120 kPa, respectively, i.e. about 30-40% improvement.

These examples demonstrate hence that the addition of the reactive viscosity reducers according to the invention allows to significantly lower blend viscosity with the same order of magnitude as conventional unreactive state of the art viscosity reducers with the advantage that the final rigid foams have better mechanical properties (limited/no plasticizing effect of the viscosity reducers according to the invention).

Table 2 summarizes the reactive compositions used and amounts of ingredients used in parts by weight (pbw) to fabricate the examples 10-18 according to the invention in the presence of a radical initiator to initiate acrylate polymerisation (Luperox® P). Similar trends as in Table 1 were observed.

TABLE 2

| Chemical (pbw) | Ex. 10 | Ex. 11 | Ex. 12 | Ex. 13 | Ex. 14 | Ex. 15 | Ex. 16 | Ex. 17 | Ex. 18 |
|---|---|---|---|---|---|---|---|---|---|
| Polyol 1 | 72.5 | 72.5 | 72.5 | 72.5 | 72.5 | 72.5 | 72.5 | 72.5 | 72.5 |
| Polyol 2 | 16.0 | 16.0 | 16.0 | 16.0 | 16.0 | 16.0 | 16.0 | 16.0 | 16.0 |
| Cyclopentane | 12.0 | 12.0 | 12.0 | 12.0 | 12.0 | 12.0 | 12.0 | 12.0 | 12.0 |
| Water | 2.3 | 2.3 | 2.3 | 2.3 | 2.3 | 2.3 | 2.3 | 2.3 | 2.3 |
| Jeffcat ® BDMA | 1.5 | 1.5 | 1.5 | 1.5 | 1.5 | 1.5 | 1.5 | 1.5 | 1.5 |
| Jeffcat ® ZF 22 | 0.1 | 0.1 | 0.1 | 0.1 | 0.1 | 0.1 | 0.1 | 0.1 | 0.1 |
| Jeffcat ® TR 90 | 0.1 | 0.1 | 0.1 | 0.1 | 0.1 | 0.1 | 0.1 | 0.1 | 0.1 |
| Foam stabilizer | 1.5 | 1.5 | 1.5 | 1.5 | 1.5 | 1.5 | 1.5 | 1.5 | 1.5 |
| TEP | — | — | — | — | — | — | — | — | — |
| DEGDMA | 6.0 | 15 | 30 | — | — | — | — | — | — |
| EGDMA | — | — | — | 6.0 | 15 | 30 | — | — | — |
| IBOMA | — | — | — | — | — | — | 6.0 | 15 | 30 |
| Luperox ® P | 0.06 | 0.15 | 0.3 | 0.06 | 0.15 | 0.3 | 0.06 | 0.15 | 0.3 |
| S5025 | 181.5 | 181.5 | 181.5 | 181.5 | 181.5 | 181.5 | 181.5 | 181.5 | 181.5 |

TABLE 2-continued

| Chemical (pbw) | Ex. 10 | Ex. 11 | Ex. 12 | Ex. 13 | Ex. 14 | Ex. 15 | Ex. 16 | Ex. 17 | Ex. 18 |
|---|---|---|---|---|---|---|---|---|---|
| Iso Index | 133 | 133 | 133 | 133 | 133 | 133 | 133 | 133 | 133 |
| Polyol blend viscosity (mPa · s) | n.m* | n.m* | n.m* | n.m* | n.m. | n.m* | n.m* | n.m* | n.m* |
| CT(s) | 23 | 28 | 30 | 32 | 35 | 38 | 27 | 31 | 32 |
| ST(s) | 159 | 158 | 180 | 188 | 203 | 255 | 156 | 188 | 206 |
| ERT(s) | 233 | 210 | 240 | 255 | 265 | 335 | 200 | 245 | 270 |
| TFT(s) | 321 | 420 | 570 | 378 | 395 | 580 | 315 | 343 | 525 |
| Density (kg/m$^3$) | 29 | 29 | 31 | 30 | 31 | 33 | 30 | 30 | 32 |
| CCC (%) | 89 | 88 | 86 | 88 | 88 | 85 | 90 | 90 | 87 |
| MCS (kPa) | 105 | 108 | 120 | 128 | 130 | 134 | 112 | 125 | 132 |

*n.m.: not measured

Comparative Examples 5-7

Polyol blends similar to Comparative example 1 with increasing levels of an acrylate compound having more than 3 reactive (meth)acrylate groups (PETRA) were prepared and the resulting viscosities were measured. The results are summarized in Table 3. No significant viscosity decrease could be depicted.

TABLE 3

| Chemical (pbw) | Comp Ex. 1 | Comp Ex. 5 | Comp Ex. 6 | Comp Ex. 7 |
|---|---|---|---|---|
| Polyol 1 | 72.5 | 72.5 | 72.5 | 72.5 |
| Polyol 2 | 16.0 | 16.0 | 16.0 | 16.0 |
| Cyclopentane | 12.0 | 12.0 | 12.0 | 12.0 |
| Water | 2.3 | 2.3 | 2.3 | 2.3 |
| Jeffcat ® BDMA | 1.5 | 1.5 | 1.5 | 1.5 |
| Jeffcat ® ZF 22 | 0.1 | 0.1 | 0.1 | 0.1 |
| Jeffcat ® TR 90 | 0.1 | 0.1 | 0.1 | 0.1 |
| Foam stabilizer | 1.5 | 1.5 | 1.5 | 1.5 |
| PETRA | — | 6.0 | 15 | 30 |
| Polyol blend viscosity (mPa.s) | 388 | 351 | 333 | 384 |

The invention claimed is:

1. A method for making a polyisocyanurate (PIR) and/or a polyurethane (PUR) comprising rigid foam, the method comprising:
combining and mixing:
a) a polyisocyanate composition comprising one or more polyisocyanate compounds;
b) an isocyanate-reactive composition comprising one or more isocyanate-reactive compounds;
c) at least one catalyst compound suitable for making the polyisocyanurate (PIR) and/or the polyurethane (PUR) comprising foam;
d) at least one blowing agent;
e) acrylate and/or methacrylate compounds as a reactive viscosity reducer wherein the acrylate and/or methacrylate compounds comprise at least one first acrylate and/or methacrylate compound selected from cyclic trimethylolpropane formal acrylate (CTFA), 3,3,5-trimethyl cyclohexyl acrylate (TMCHA), isobornyl acrylate (IBOA), 4-tert-butylcyclohexyl acrylate (TBCHA), benzyl acrylate (BZA), phenol (EO) acrylate (PHEA), benzyl methacrylate (BZMA), phenoxyethyl methacrylate (PHEMA), tetrahydrofurfuryl methacrylate (THFMA), isobornyl methacrylate (IBOMA), and mixtures thereof and at least one second acrylate and/or methacrylate compound having no isocyanate-reactive groups and having 2 or 3 reactive acrylate groups or methacrylate groups and having a viscosity at 25° C.≤30 mPa·s; and optionally
f) one or more surfactants, one or more flame retardants, one or more antioxidants, or combinations thereof;
to form a reactive composition; and
reacting the reactive composition in the absence of a thermal radical initiator to produce the PIR and/or PUR comprising rigid foam; and optionally,
subjecting the PIR and/or PUR comprising rigid foam to a post foaming temperature treatment,
wherein e) the acrylate and/or methacrylate compounds are polymerized by heat generated during the reaction of the reactive composition and during the optional post foaming temperature treatment.

2. The method according to claim 1, wherein the amount of the reactive viscosity reducer in the reactive composition is in the range 0.1 wt % up to 50 wt % calculated on the total weight of the reactive composition.

3. The method according to claim 1, wherein the one or more polyisocyanate compounds are selected from the group consisting of a toluene diisocyanate, a methylene diphenyl diisocyanate and a mixture thereof.

4. The method according to claim 1, wherein the one or more isocyanate-reactive compounds comprise a polyol having an average hydroxyl number of from 50 to 1000 mg KOH/g, and a hydroxyl functionality of from 2 to 8.

5. The method according to claim 1, wherein the at least one blowing agent is present in an amount of up to 80 parts by weight per hundred parts by weight of the one or more isocyanate-reactive compounds.

6. The method according to claim 1, wherein the reactive viscosity reducer is added to the isocyanate composition before combining and mixing the isocyanate composition with the isocyanate-reactive composition.

7. The method according to claim 1, wherein the reactive viscosity reducer is added to the isocyanate-reactive composition before combining and mixing the isocyanate-reactive composition with the isocyanate composition.

8. The method according to claim 1, wherein the reactive viscosity reducer is added as a separate stream to the reactive composition when combining and mixing the isocyanate-reactive composition with the isocyanate composition.

9. The method according to claim 1, wherein the method is performed at an isocyanate index of 180 or higher and the at least one catalyst compound is selected from at least one trimerisation catalyst.

10. The method according to claim 1, wherein the method is performed at an isocyanate index in the range 80-180 and the at least one catalyst compound is selected from at least one polyurethane catalyst.

* * * * *